US United States Patent Office 2,902,343
Patented Sept. 1, 1959

2,902,343

PROCESS FOR THE PREPARATION OF HYDROUS POTASSIUM MAGNESIUM SULFATE FROM KAINITE CONTAINING SODIUM CHLORIDE

Pietro Saccardo, Milan, Italy, assignor to Sincat Società Industriale Catanese S.p.A., Milan, Italy No Drawing. Application March 6, 1957
Serial No. 644,206

Claims priority, application Italy September 14, 1956

6 Claims. (Cl. 23—121)

The present invention relates to a process for preparing hydrous magnesium potassium sulfate, e.g. schoenite or leonite, substantially free from sodium chloride, by the processing of naturally occurring kainite.

Kainite, being $KCl.MgSO_4.3H_2O$, has been largely used for some time as a starting material for the manufacture of potassium fertilizers. However, the usefulness of kainite for this purpose is considerably impaired by the more or less considerable quantity of NaCl which is naturally contained therein as an impurity and is difficult to separate. Many purifying processes have been suggested to overcome this difficulty; some have also been used in the industry. However, all of them have been given up and for various reasons the processing of the kainite has been abandoned since the early part of this century. The purifying processes of some importance were those in which the mineral was dissolved in the heat and a potassium magnesium salt was precipitated by cooling, such as the Douglas, Dupré; Hake, Borsche and Gruneberg and similar processes. In these processes, either the entire mineral was dissolved or the NaCl was left behind undissolved. The dissolving liquor used was a brine of kainite, $MgSO_4$ or NaCl saturated at room temperature. By cooling the heat-saturated solution, the potassium magnesium salt was crystallized and could be separated. The mother liquors were recycled to dissolve new batches of the mineral. As the heat consumption in these processes was very high owing to the large quantities of circulating brine relative to the quantity of potassium magnesium salt produced, these processes were rather expensive. Moreover, the degree of purity of the potassium magnesium salt obtained was not high enough for the further processing of the salt to produce $K_2SO_4$, as it still contained NaCl in a proportion from 10% to 22% and even more. The yields were low as considerable amounts of potassium were lost in the undissolved residues and the finally rejected mother liquors.

Another process that had an industrial application was the one by Precht (process of Neustassfurt), consisting in decomposing the kainite with an $MgCl_2$ brine at temperatures ranging from 120° to 150° under pressures from 2 to 5 atmospheres. This process produces langbeinite ($K_2SO_4.2MgSO_4$) in the form of a very fine, dust-like powder which can be separated from the mineral mechanically, e.g. by means of rotating sieve drums. This process has the disadvantage that it requires $MgCl_2$ brines whose contents of $MgCl_2$ are comprised within fixed limits, and that the finally rejected mother liquors contain a high proportion of potassium, which makes necessary to utilize these mother liquors in other processes in order to keep the losses within reasonable limits. Even this fairly expensive process does not yield a product completely free from NaCl and has, therefore, been given up.

More recently it has been suggested to use the known alkali salt flotation methods for the separation of the kainite from the accompanying NaCl, whereby almost pure kainite can be obtained in yields of about 90%. Although this method is attractive from the technological point of view; as prior to the present invention it has been the only one by which almost pure kainite can be prepared in a very simple manner, it is not so attractive economically, for it merely removes the NaCl and yields kainite with a high percentage of $KCl.MgSO_4.3H_2O$, but it does not change the chemical composition of the potassium magnesium salt. Therefore, the latter has still to be chemically converted with a view to manufacturing a commercially accepted product. Hence the flotation of crude kainite merely produces an intermediate product, and this in a rather expensive manner because of the consumption of flotating agents and the high operating costs. The cost of the final product (potassium sulfate or potassium magnesium sulfate) made from the flotated kainite will accordingly be high.

The various disadvantages of the known processes discussed above are overcome by the present invention. This has the object to provide a simple and cheap process for producing potassium magnesium sulfate from crude kainite or similar potassium magnesium minerals containing NaCl, e.g. halite, as impurity, even a high proportion thereof, and this without any previous enrichment of the mineral.

It is known that kainite can be converted into schoenite by treatment with water at room temperature according to the equation:

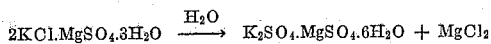

$$2KCl.MgSO_4.3H_2O \xrightarrow{H_2O} K_2SO_4.MgSO_4.6H_2O + MgCl_2$$

By a similar reaction, leonite can be produced instead of schoenite.

The quantity of water used for this reaction will be calculated in accordance with the solubility of the amount of $MgCl_2$ which is liberated by the reaction under equilibrium conditions.

From kainite contaminated with NaCl one obtains in this way schoenite containing some NaCl as impurity. The solubility of the NaCl in the chemically balanced reaction liquors is very low, from about 3 to 6% by weight.

For the production of potassium magnesium sulfate free from NaCl so much water could be used for the reaction aforesaid that all the NaCl is dissolved, but in that case so much potassium salt would also be dissolved that the process would have very low yields. If, instead, the NaCl containing potassium magnesium sulfate is washed with water, the NaCl can be removed but again, a considerable quantity of potassium sulfate will dissolve in the washing waters.

This invention consists in a process for the manufacture of highly pure hydrous potassium magnesium sulfate from NaCl-containing natural potassium chloride-magnesium sulfate minerals, especially kainite, wherein the crude mineral, preferably ground finely, is treated with vigorous agitation with water used in an amount equal to or slightly larger than the amount required for dissolving the $MgCl_2$ liberated by the treatment under equilibrium conditions so as to produce finely divided potassium magnesium sulfate while the NaCl is left virtually unaffected; the salt mixture is suspended in a separating liquid in which the settling speed of the NaCl is greater than that of the potassium magnesium sulfate; and the latter is separated from the former by decantation or the like.

Recycled mother liquor from a preceding cycle of operation may be used as a separating liquid.

This process can be designed for the continuous production of virtually pure schoenite from crude kainite contaminated with NaCl.

Morevor, as this process uses only the minimum of water required for the conversion of kainite into hydrous potassium magnesium sulfate, a high yield of pure sulfate can be obtained even from poor kainite.

Further, this process requires no chemical reagents of any kind and practically no steam, the electrical power requirements are low, and the necessary equipment is very simple.

By a modification of the invention the most characteristic feature of the latter, i.e. the separation of potassium magnesium sulfate fines from a coarser NaCl sediment by means of an appropriate separating liquid, especially a recycle brine, is applied to crude schoenite, leonite or another NaCl containing potassium magnesium sulfate other than produced by the conversion of kainite.

The process according to the invention is illustrated by the following examples to which it is not limited.

Example 1

Kainite containing (in percent by weight)

| K· | Mg·· | SO$_4$″ | Cl′ | Na· | Ca·· | H$_2$O |
|---|---|---|---|---|---|---|
| 6.98 | 4.03 | 19.20 | 38.50 | 21.9 | 0.44 | 8.95 | is ground to a fineness so as to pass a 35 mesh sieve. 600 gr. thereof is vigorously shaken with 260 g. of water at room temperature. This operation produces a suspension of very fine crystals of schoenite and a heavy sediment of coarser crystals of NaCl. Upon addition of 300 g. of mother liquor recycled from a previous similar operation, the fine schoenite in suspension may be decanted from the coarse residue. The decanted schoenite suspension is then filtered by means of a suction filter, and the schoenite is washed on the filter with water. The coarse NaCl sediment is filtered and washed with warm water. Both salts are separately dried. In the result one obtains 139 g. of schoenite containing (in percent by weight):

| K· | Mg·· | SO$_4$″ | Cl′ | Ca·· | Na· | H$_2$O |
|---|---|---|---|---|---|---|
| 18.08 | 6.23 | 52.8 | 0.26 | 0.8 | 2.12 | 20.6 | and 277.8 g. of crude NaCl containing

| K· | Mg·· | SO$_4$″ | Cl′ | Na· | Ca·· |
|---|---|---|---|---|---|
| 0.53 | 0.20 | 3.45 | 57.8 | 38.06 | 0.4 |

The yield of potassium is about 60%.

Example 2

If the same kainite as used in Example 1 is treated in the same manner as described but the quantity of 260 g. of water is replaced by 180 g. of water plus the combined washing waters of a preceding cycle, amounting to 154 g. the products consist of:

(a) 151.5 g. of schoenite of the following composition:

| K· | Mg·· | SO$_4$″ | Cl′ | Ca·· | Na· | H$_2$O |
|---|---|---|---|---|---|---|
| 18.0 | 6.26 | 51.1 | 0.35 | 1.2 | 0.85 | 22.01 |

(b) 244 g. of crude NaCl of the following composition:

| K· | Mg·· | Ca·· | SO$_4$″ | Cl′ | Na· |
|---|---|---|---|---|---|
| 1.27 | 0.45 | 0.4 | 5.18 | 55.84 | 36.64 |

The total potassium yield is about 65%.

Example 3

3000 g. of kainite of the following composition:

| K· | Mg·· | SO$_4$″ | Ca·· | Cl′ | Na· | H$_2$O |
|---|---|---|---|---|---|---|
| 9.28 | 5.72 | 23.13 | 0.15 | 33.01 | 16.10 | 12.74 | ground to a fineness such as to pass through a 50 mesh sieve, is vigorously shaken with 1650 g. of water at room temperature. Then 3000 g. of mother liquor recycled from a previous cycle is admixed to the suspension. The suspension of fines is then separated from the coarser crystalline sediment. The two salts are separately suction-filtered, the fine schoenite is washed on the filter with cold water, and the NaCl sediment is similarly washed with warm water. The salts are dried and consist of:

(a) 1060 g. of schoenite containing:

| K· | Mg·· | SO$_4$″ | Ca·· | Cl′ | Na· | H$_2$O |
|---|---|---|---|---|---|---|
| 18.37 | 6.43 | 50.8 | 0.58 | 0.88 | 0.62 | 22.62 |

(b) 970 g. of crude NaCl containing:

| K· | Mg·· | SO$_4$″ | Ca·· | Cl′ | Na· |
|---|---|---|---|---|---|
| 0.66 | 0.25 | 2.3 | 0.16 | 58.23 | 37.7 |

The potassium yield is about 70%.

The washing waters are recycled to a subsequent cycle of operation in which they are admixed to the water of reaction.

Example 4

300 g. of kainite containing:

| K· | Mg·· | Ca·· | SO$_4$″ | Cl′ | Na· | H$_2$O |
|---|---|---|---|---|---|---|
| 11.48 | 7.16 | 0.1 | 28.78 | 26.1 | 9.4 | 16.55 | and ground to a fineness so as to pass through a 35 mesh sieve, is vigorously shaken with 180 g. of water, or with 140 g. of water plus an appropriate quantitiy of washing waters recycled from a preceding cycle of operation. The suspension of fines is separated by decantation from the coarser sediment. The two salts are washed and dried separately, all this as described in Eaxmple 1. The products are:

(a) 130.2 g. of schoenite containing:

| K· | Mg·· | SO$_4$″ | Cl′ | Na· | Ca·· | H$_2$O |
|---|---|---|---|---|---|---|
| 19.79 | 6.52 | 51.07 | 0.87 | 1.22 | 0.092 | 19.75 |

(b) 55 g. of crude NaCl containing:

| K· | Mg·· | SO$_4$″ | Cl′ | Na· | Ca·· |
|---|---|---|---|---|---|
| 0.92 | 0.37 | 3.27 | 57.2 | 37 | 0.081 |

The potassium yield is about 75%.

Example 5

202 g. of crude schoenite containing 18.3% of K$_2$O and 20.8% of NaCl is suspended in a brine consisting of mother liquors from the preparation of schoenite as described in the preceding examples. The suspension of the fines is separated from a coarser sediment and filtered, the filter residue is washed and dried. The product consists of 151.5 g. of schoenite containing 23.2% of K$_2$O and 0.8% of Cl. The dried heavier sediment consists of 45.7 g. of NaCl containing 0.45% of potassium.

The separation of the suspension of fines from the coarser sediment may be effected by any suitable means known per se, e.g. tip cases, separating cones, hydrocyclones, centrifuges, shakeout tables, or by means of devices whose operation is based on the different sizes of the fines and sediment crystals, e.g. sieves, hydraulic sieves, vibrating sieves, sieve drums or the like.

What I claim is:

1. The process of obtaining substantially pure potassium-magnesium sulphate from kainite containing appreciable quantities of NaCl as an impurity comprising the steps of reacting the impure kainite under conditions of vigorous agitation with a quantity of water sufficient to convert the kainite into a thick aqueous suspension of finely divided potassium-magnesium sulphate and further, at least sufficient to dissolve the $MgCl_2$ produced under said reaction conditions, but insufficient to substantially dissolve the aforesaid NaCl, adding an inert aqueous separating liquid to reduce the density of the said thick suspension of finely divided potassium-magnesium sulphate, and then separating the said finely divided potassium-magnesium sulphate from the undissolved original relatively coarse NaCl crystals.

2. The process of claim 1 in which separation of the finely divided potassium-magnesium sulphate from the relatively coarse NaCl is effected through the differential speed of sedimentation of the respective crystals in the aqueous suspension.

3. The process of claim 1 in which the inert separating liquid comprises the mother liquors resulting from the conversion of kainite to potassium-magnesium sulphate.

4. The process of claim 1 in which the inert separating liquid suspending the NaCl and the produced potassium-salts are composed of brines that are in chemical equilibrium with a solid phase containing potassium-magnesium sulphate and sodium chloride.

5. The process of claim 1 in which the NaCl and the potassium-magnesium sulphate obtained are separately washed with water, and the resulting washing waters are employed together with fresh water for the further conversion of raw kainite.

6. The process of claim 1 in which there is added as an auxiliary separating liquid a predetermined ratio of mother liquor brine to the water used for the conversion of kainite to potassium-magnesium sulphate.

References Cited in the file of this patent

UNITED STATES PATENTS

| | | |
|---|---|---|
| 229,249 | Hake | June 29, 1880 |
| 1,244,884 | Nagelvoort | Oct. 30, 1917 |
| 1,357,973 | Giesecke | Nov. 9, 1920 |
| 1,813,575 | Janecke et al. | July 7, 1931 |

OTHER REFERENCES

Mellor: "Comprehensive Treatise on Inorganic and Theoretical Chemistry," vol. 4, pp. 240–344, 1923, Longmans, Green and Co., New York.